Sept. 14, 1948. S. H. GAREY 2,449,289
AXIALLY SHIFTING HYDRAULIC RIM
AND TIRE SEPARATING DEVICE
Filed May 1, 1945 2 Sheets-Sheet 1

Inventor
SANFORD H. GAREY

By Clarence A. O'Brien
and Harvey B. Jacobson
Attorneys

Sept. 14, 1948.  S. H. GAREY  2,449,289
AXIALLY SHIFTING HYDRAULIC RIM
AND TIRE SEPARATING DEVICE
Filed May 1, 1945  2 Sheets-Sheet 2
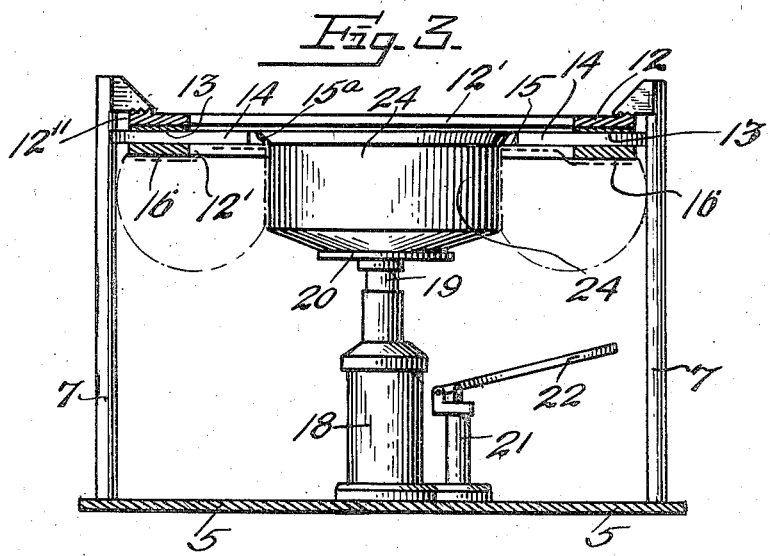
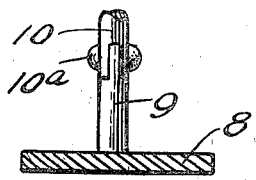
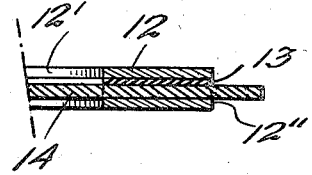
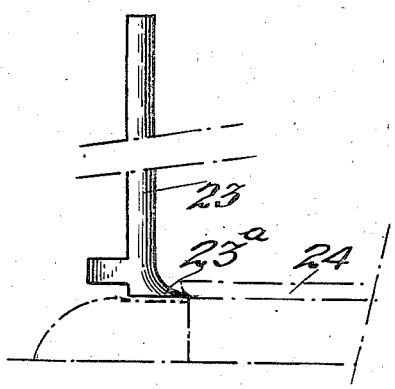
Inventor
SANFORD H. GAREY
By Clarence A. O'Brien
and Harvey B. Jackson
Attorneys Patented Sept. 14, 1948

2,449,289

UNITED STATES PATENT OFFICE 2,449,289

AXIALLY SHIFTING HYDRAULIC RIM AND TIRE SEPARATING DEVICE

Sanford H. Garey, Uvalde, Tex.

Application May 1, 1945, Serial No. 591,361

1 Claim. (Cl. 157—6)

This invention relates to an improved tire working tool, and one of its objects is to provide a tool which will hold the outer portions of the tire casing against movement, while hydraulic pressure is applied concentrically to the tire rim, so that uniform pressure may be developed against all of the tire and the bead of the tire stripped from the tire rim, without subjecting the tire bead or the entire tire casing to structural distortions, or requiring the use of leverage manipulations which bruise the tire and impair its subsequent service qualities.

Another object of the invention is to provide a horizontally supported frame with a series of horizontally and radially adjustable bars, arranged to overlie a truck tire casing, and to provide an hydraulic pressure device in the center of the frame, upon which the tire rim can be forced upwardly to strip the same concentrically from the tire casing.

With the above and other objects in view, the invention consists in certain new and useful constructions, combinations, and arrangements of parts, clearly described in the following specification, and fully shown in the accompanying drawings, in which—

Fig. 3 is a vertical sectional view, taken on line 3—3 of Fig. 1, looking in the direction of the arrows.

Fig. 4 is a detail vertical sectional view, taken on line 4—4 of Fig. 1, looking in the direction of the arrows.

Fig. 5 is a detail vertical sectional view, taken on line 5—5 of Fig. 1, looking in the direction of the arrows.

Fig. 6 is a detail side view of a hand operated lever, partly broken away.

Figure 1:
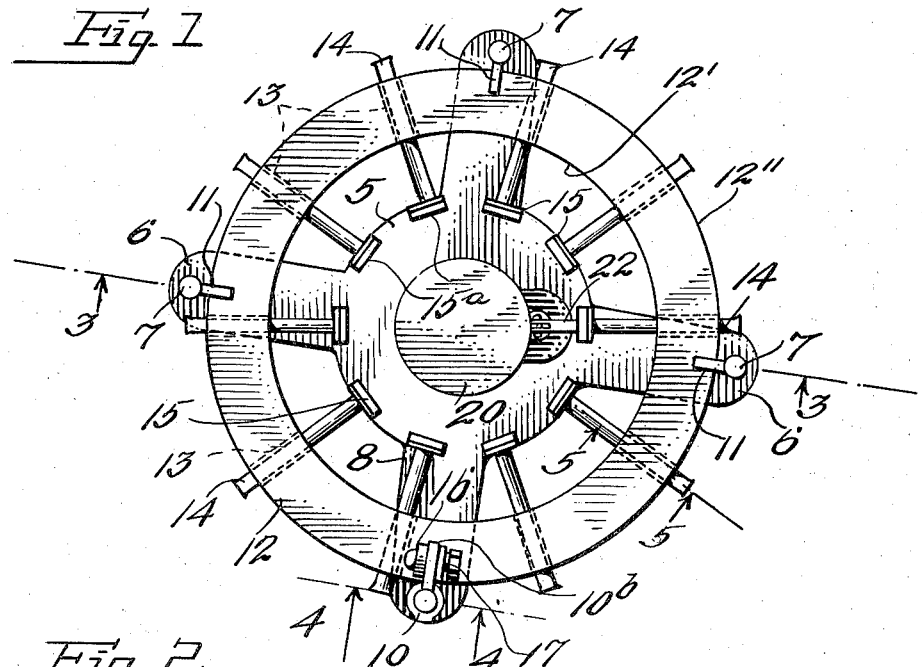
Fig. 1 is a top plan view.
Figure 2:
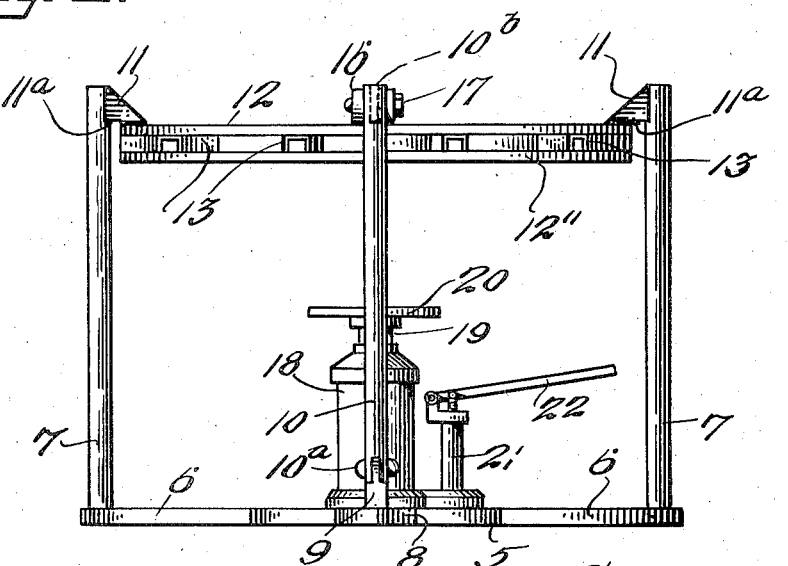
Fig. 2 is a side elevation.

Referring to the accompanying drawings, which illustrate the practical embodiment of my invention, 5 designates a metal base plate, which is constructed with or provided with a plurality of radial arms 6. On the outer end of each of these arms a post 7 is secured at its lower end. There are three arms 6, and they are spaced approximately ninety degrees from each other in a circular arc. A fourth arm 8 is provided to which the lower end of the stud post 9 is fixed. On this stud post the lower end of the extension 10 is hinged by the pin 10a. This extension 10 is located ninety degrees from the adjacent posts 7.

The upper ends of the posts 7 are equipped with bracket arms 11, which are welded or otherwise fixed thereto, and which project toward the center of the base plate 5, and each of these bracket arms is provided with a straight edge 11a on its lower side. A ring 12 is welded directly to the bracket arms 11, and is thereby supported in concentric relation to the posts 7 and the base plate 5, the upper plane face of this ring directly engaging the straight edges 11a of the bracket arms 11.

The ring 12 is provided with radial channels 13, spaced equal distances from each other, and in each of these channels a horizontal bar 14 is arranged to slide. The inner end of each bar is provided with a rim engaging tool head 15, having a chisel edge 15a, which is adapted to be driven between the tire rim and the tire. This tool head normally projects inwardly of the inner peripheral edge 12' of the ring 12, while the outer end of the bar projects outwardly of the outer peripheral edge 12'' of the ring 12. These bars are arranged to freely slide horizontally in the radial channels 13 of the ring 12, and may therefore be manually shifted inwardly or outwardly.

The ring 12 is equipped with upstanding ears 16, and the upper end of the post extension 10 is equipped with a bracket arm 10b which is adapted to fit between the ears 16. A manually slidable pin 17 is extended through registering openings formed in the ears 16 and in the bracket arm 10b of the post extension 10, so as to lock the post extension against outwardly swinging movement on the base plate.

Centrally of the base plate 5 an hydraulic jack or cylinder 18 is fixed, and in this cylinder the ram or plunger 19 works. On the upper end of this plunger or ram a tire platform or supporting head 20 is fixed. Pressure is developed in the cylinder 18 by means of the hand operated pressure device 21, which includes the operating lever 22.

The wheel tire is placed on the platform or plate 20, while the plunger is in its lower position, and the tire and rim are raised so that the rim of the tire will be brought to the plane of the chisel edges 15a. The radial bars 14 are then forced against the tire rim, and if necessary the hand tool 23, shown in Fig. 6, which is also provided with a chisel edge 23a, may be operated, to provide a gap between the tire rim and the bead of the casing.

The post extension 10 is opened outwardly to provide an entrance for placing the tire upon the plunger head, and after the tire has been so placed, the post extension is locked in place against the ear 16 by means of the slip pin 17.

After all of the tool heads 15 of the sliding bars 14 have been engaged to the tire rim, hydraulic pressure is developed on the plunger 19 to force the tire rim, indicated at 24, upwardly, through the inner ends of the radial restraining arms 14, which prevent the tire casing from moving upwardly as the rim is forced out of the casing.

The hydraulic pressure is applied centrally to the rim, so that equal pressure is developed against all portions of the rim, while no pressure is applied directly to the tire casing. Distortion of the rim is thus avoided and a true concentric displacement of the rim on the tire casing is obtained.

It is to be understood that each horizontal bar 14 is provided at its outer end, that is, the end opposite the tool head 15 with a suitable stop to prevent the bar from sliding all the way through its respective channel. Such a stop may take the form of a cross-pin or may be produced by swedging or upsetting the outer end to such a degree that when the bar slides to innermost limits the outer end of the bar will not enter its respective channel.

It is understood that all materials available for the construction shown may be used, and that various changes in the details of construction, their combination and arrangement, may be resorted to, within the scope of the invention, as defined by the claim hereof.

Having described my invention I claim as new:

Tire working apparatus which includes a base, a hydraulic cylinder rising axially from the base, an annular row of circumferentially spaced posts fixed to the base and rising therefrom in spaced relation to the cylinder, a ring fixed to the posts adjacent their upper ends, said ring lying in spaced parallel relation to the base and concentric about the axis of the cylinder, said ring having circumferentially spaced radially disposed guide channels extending therethrough, bars slidable in the guide channels toward or away from the axis of the cylinder, tool heads at the inner ends of the bars for engaging a tire and holding it against upward movement, a fluid actuated plunger slidable axially through the upper end of the cylinder, a tire rim supporting head at the upper end of the plunger and means mounted on the base near the cylinder to introduce fluid under pressure into the cylinder to elevate the plunger and exert a lifting effort against a rim resting on the head.

SANFORD H. GAREY.

REFERENCES CITED

The following references are of record in the file of this patent:

UNITED STATES PATENTS

| Number | Name | Date |
|---|---|---|
| 1,481,061 | Hunter | Jan. 15, 1924 |
| 1,564,496 | Staugaard | Dec. 8, 1925 |
| 1,758,264 | Senger | May 13, 1930 |
| 2,034,819 | Maulis | Mar. 24, 1936 |
| 2,228,086 | Rodgers | Jan. 7, 1941 |
| 2,351,355 | Merrett | June 13, 1944 |
| 2,375,956 | Smith et al. | May 15, 1945 |

FOREIGN PATENTS

| Number | Country | Date |
|---|---|---|
| 659,107 | Germany | Dec. 22, 1935 |